United States Patent
Coulter et al.

(10) Patent No.: US 10,866,769 B2
(45) Date of Patent: Dec. 15, 2020

(54) DATA CACHE SYNCHRONIZATION IN TWO-PHASE PRINTING PROCESSES

(71) Applicants: Justin J. Coulter, Longmont, CO (US); David Ward, Broomfield, CO (US)

(72) Inventors: Justin J. Coulter, Longmont, CO (US); David Ward, Broomfield, CO (US)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 16/286,288

(22) Filed: Feb. 26, 2019

(65) Prior Publication Data
US 2020/0272376 A1    Aug. 27, 2020

(51) Int. Cl.
G06F 3/12    (2006.01)
G06K 15/02    (2006.01)

(52) U.S. Cl.
CPC .......... *G06F 3/1215* (2013.01); *G06F 3/124* (2013.01); *G06F 3/1243* (2013.01); *G06F 3/1284* (2013.01); *G06K 15/1857* (2013.01); *G06K 15/1863* (2013.01)

(58) Field of Classification Search
CPC ...... G06F 3/1215; G06F 3/124; G06F 3/1243; G06F 3/1284; G06F 3/1213; G06F 3/126; G06K 15/1857; G06K 15/1863; G06K 15/1856; G06K 15/1859; G06K 15/1836
See application file for complete search history.

(56) References Cited

U.S. PATENT DOCUMENTS

| | | | |
|---|---|---|---|
| 8,310,696 B2 | 11/2012 | Gustafson et al. | |
| 8,339,636 B2 | 12/2012 | Yamada et al. | |
| 8,520,226 B2 | 8/2013 | Klassen | |
| 8,619,294 B2 | 12/2013 | Taniuchi | |
| 8,749,829 B2 | 6/2014 | Teshima | |
| 8,780,373 B2 | 7/2014 | Rivadeneira et al. | |
| 2004/0196498 A1* | 10/2004 | Klassen | G06F 3/1285 358/1.15 |

(Continued)

FOREIGN PATENT DOCUMENTS

JP    4479289 B2    6/2010

OTHER PUBLICATIONS

Anonymous; Optimal splitting of PDF/VT DPart catalog; IP.com; Dec. 13, 2012.

(Continued)

*Primary Examiner* — Iriana Cruz
(74) *Attorney, Agent, or Firm* — Duft & Bornsen, PC (57) ABSTRACT

Embodiments herein describe a two-phase printing process that utilizes page-to-resource tracking during the first rip-to-spool phase in order to perform resource scheduling during the second print-from-spool phase. In one embodiment, compute nodes include a RIP and a raster builder. A controller receives a print job, identifies a distribution of logical pages in the print job to the compute nodes, and generates page assignment information that maps the logical pages to the compute nodes based on the distribution. The compute nodes rasterize the logical pages to generate intermediate data using the RIPs, and store the intermediate raster data at a RIP spool. The controller directs a distribution of the intermediate raster data from the RIP spool to the compute nodes based on the page assignment information, and the compute nodes assemble the intermediate raster data into complete raster data using the raster builders.

20 Claims, 7 Drawing Sheets

(56) References Cited

U.S. PATENT DOCUMENTS

2013/0016380 A1* 1/2013 Johnson ............. G06K 15/1861
358/1.13
2018/0039870 A1* 2/2018 Ono ................... G06K 15/1886

OTHER PUBLICATIONS

Fabio Giannetti et al.; High Performance XSL-FO Rendering for Variable Data Printing; Apr. 2006.

* cited by examiner

DATA CACHE SYNCHRONIZATION IN TWO-PHASE PRINTING PROCESSES

FIELD

This disclosure relates to the field of printing systems, and in particular, to print controllers that interpret and rasterize incoming print jobs.

BACKGROUND

In the field of printing, it is generally desirable to maximize not just printing quality, but also printing speed at a printer. Customers tend to dislike any delay that occurs between sending a print job to a printer, and receiving the printed sheets of the print job. Therefore, printer manufacturers strive to optimize not only the physical printing speed of marking engines that mark printed sheets, but also the processing speed of devices that prepare incoming print jobs for printing by interpreting and rasterizing them.

In order to increase the processing speed for incoming print data, print controllers often include multiple Raster Image Processors (RIPs) that operate in parallel. The print controller splits the incoming print job into groups of logical pages, and sends the groups of logical pages to different parallel RIPs for interpretation and rasterization.

A two-phase printing process may first entail performing a rip-to-spool process followed by a print-from-spool process. During the rip-to-spool process, print jobs are interpreted and rasterized using multiple RIPs operating in parallel, with the resulting raster data written to a RIP spool. During the print-from-spool process, the raster data is de-spooled from the RIP spool and assembled by the print controller into the final raster output for submission to one or more print engines. Typically, the assembly process also operates in parallel to improve performance, similarly to the parallel RIP process.

Some print jobs include objects that are referenced across multiple pages. Such objects may be rasterized once and cached for reuse when processing subsequent pages that reference the objects. For example, a logo which may appear on multiple pages of a print job may be rasterized once when encountered on a logical page and cached for reuse when processing subsequent logical pages.

However, due to the parallel nature of the rasterization process and the assembly process, the raster data for objects that may be needed during page assembly may not be readily available to the processing elements of the print controller, which can significantly reduce the performance of the printing process.

SUMMARY

Embodiments herein describe a two-phase printing process that utilizes page-to-resource tracking during the first rip-to-spool phase in order to perform resource scheduling during the second print-from-spool phase. Page-to-resource tracking records how pages in a print job are assigned to compute nodes on the print controller during rasterization of the print job, which allows for more efficient scheduling of raster data processing at print time. For instance, the raster data generated by a particular compute node may be 'replayed' back through the same compute node to enable local data caching performed during the first rasterization phase to be available during the second print phase. The use of page-to-resource tracking during the second phase improves the performance of the printing process by reducing the number of cache misses that may occur when the local data used during the second phase is missing in the local cache of the resource.

One embodiment comprises an apparatus that includes at least two compute nodes, where each compute node includes a RIP and a raster builder. The apparatus further includes a controller. The controller receives a print job, identifies a distribution of logical pages in the print job to the at least two compute nodes, and generates page assignment information that maps the logical pages to the at least two compute nodes based on the distribution. The at least two compute nodes rasterize the logical pages to generate intermediate data using the RIPs, and store the intermediate raster data at a RIP spool. The controller directs a distribution of the intermediate raster data from the RIP spool to the at least two compute nodes based on the page assignment information, and the at least two compute nodes assemble the intermediate raster data into complete raster data using the raster builders.

Another embodiment comprises a method of performing page synchronization during a first-phase of a two-phase printing process. The method comprises receiving a print job, identifying a distribution of logical pages in the print job to at least two compute nodes, and generating page assignment information that maps the logical pages to the at least two compute nodes based on the distribution. The method further comprises rasterizing, by the at least two compute nodes, the logical pages to generate intermediate raster data, storing the intermediate raster data at a spool, distributing the intermediate raster data from the spool to the at least two compute nodes based on the page assignment information, and assembling, by the at least to compute nodes, the intermediate raster data into complete raster data.

Another embodiment comprises a non-transitory computer readable medium embodying programmed instructions which, when executed by at least one processor, direct the one or more processors to receive a print job, to identify a distribution of logical pages in the print job to at least two compute nodes, and to generate page assignment information that maps the logical pages to the at least two compute nodes based on the distribution. The instructions further direct the one or more processors to rasterize, by the at least two compute nodes, the logical pages to generate intermediate raster data, to store the intermediate raster data at a spool, to distribute the intermediate raster data from the spool to the at least two compute nodes based on the page assignment information, and to assemble, by the at least to compute nodes, the intermediate raster data into complete raster data.

The above summary provides a basic understanding of some aspects of the specification. This summary is not an extensive overview of the specification. It is intended to neither identify key or critical elements of the specification nor delineate the scope of the embodiments of the specification, or delineate the scope of the claims. Its sole purpose is to present some concepts of the specification in a simplified form as a prelude to the more detailed description that is presented later.

DESCRIPTION OF THE DRAWINGS

Some embodiments are now described, by way of example only, and with reference to the accompanying drawings. The same reference number represents the same element or the same type of element on all drawings.

DESCRIPTION

The figures and the following description illustrate specific exemplary embodiments. It will be appreciated that those skilled in the art will be able to devise various arrangements that, although not explicitly described or shown herein, embody the principles described herein and are included within the contemplated scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

Some print job pages are designed with reusable (e.g., static) print objects for optimal rasterization performance. For example, a logo may be represented as an image object that is referenced on each logical page of a print job. This logo would be considered a prime candidate for being cached and reused on subsequent logical page references. However, some print jobs may be processed in two phases. The first phase entails the rasterization of the pages of the print job and storing the rasterized pages to a RIP spool (e.g., a rip-to-spool process) and the second phase entails making the rasterized pages at the RIP spool ready for printing (e.g., a print-from-spool process). This two-phase print job processing is optimal for some printing aspects, such as ripping a set of j obs to the RIP spool and deferring the print phase to a later time, or for ensuring a complex print job can be printed at rated engine speed for higher output resolutions. However, when there is no synchronization between the rip-to-spool phase and print-from-spool phase, the printing aspect of this two-phase processing results in cache miss problems that prevents optimal reusable static object cache usage. This condition is a contributor to the poor throughput in a two-phase print processing when the print jobs include objects that are cached.

In the embodiments described herein, synchronization is used between the rip-to-spool phase and the print-from-spool phase. In particular, page tracking is used during the rip-to-spool phase to track which logical pages in a print job are distributed to which compute nodes when generating raster data for the print job. During the print-from-spool phase, the tracking information is used to distribute the raster data to the compute nodes. The compute nodes may already include local data cached during the rip-to-spool phase in some embodiments (e.g., the raster page data is 'replayed' through the same compute nodes that generated the rasterized page data where the local data for the page has been retained in the cache of the compute node). In other embodiments, the tracking information is used to pre-load the compute nodes with the previously cached data. Either embodiment ensures that static data cached during the rip-to-spool phase is available to a compute node in the cache of the compute node during the print-from-spool phase.

Figure 1:
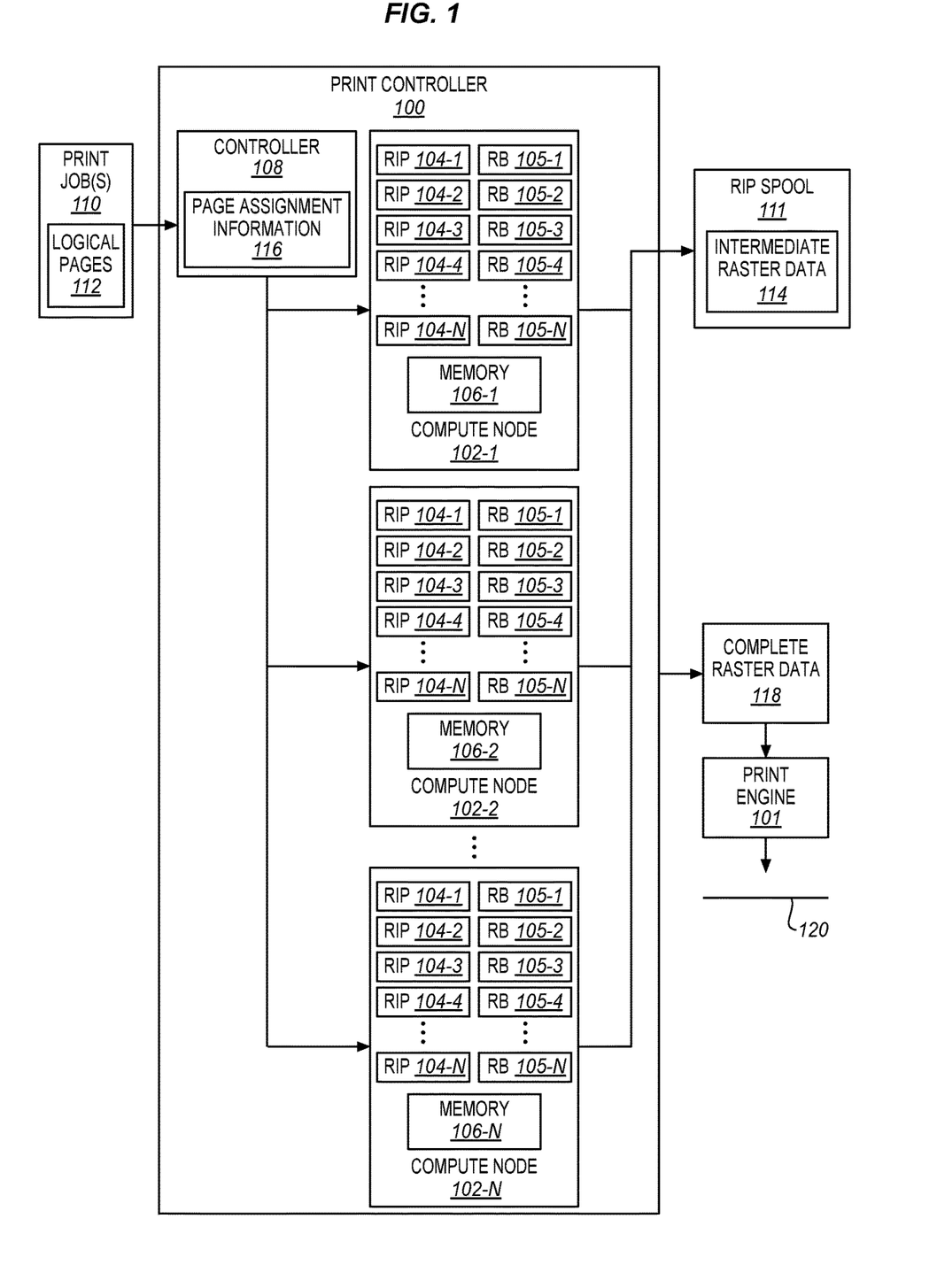
FIG. 1 is a block diagram of a print controller, a print engine, and a RIP spool in an illustrative embodiment.

FIG. 1 is block diagram of a print controller 100 (i.e., an apparatus), a print engine 101, and a RIP spool 111 in an illustrative embodiment. In some embodiments, print controller 100 may be referred to as a Digital Front End (DFE). Print controller 100 may operate outside of a printing system as a separate element in some embodiments, or may be included within a printing system in other embodiments. Further, print controller 100 may be included within print engine 101 in some embodiments. Also, RIP spool 111 may be included within print controller 100 in some embodiments or separate and communicatively coupled to print controller 100 in other embodiments.

While the specific hardware implementation of print controller 100 is subject to design choices, print controller 100 may comprise any electronic circuits and/or optical circuits that are able to perform the functions described herein for print controller 100. Print controller 100 may include one or more Central Processing Units (CPU), Graphics Processing Units (GPU), microprocessors, Digital Signal Processors (DSPs), Application-specific Integrated Circuits (ASICs), Programmable Logic Devices (PLD), control circuitry, etc. Some examples of processors include INTEL® CORE™ processors, Advanced Reduced Instruction Set Computing (RISC) Machines (ARM®) processors, etc.

Print controller 100 and RIP spool 111 may further comprise any electronic circuits, and/or optical circuits, and/or magnetic circuits that are able to store data. For instance, print controller 100 and/or RIP spool 111 may include one or more volatile or non-volatile Dynamic Random-Access Memory (DRAM) devices, FLASH devices, volatile or non-volatile Static RAM devices, magnetic disk drives, Solid State Disks (SSDs), etc. Some examples of non-volatile DRAM and SRAM include battery-backed DRAM and battery-backed SRAM.

In this embodiment, print controller 100 includes a plurality of compute nodes 102, each of which include a plurality of RIPs 104, a plurality of Raster Builders (RB) 105, and a memory 106. In one embodiment, memory 106 may comprise a static data cache. The static data cache may comprise a memory device and/or disk storage. RIPs 104 may be implemented in hardware, firmware, or a combination of hardware and firmware. RIPs 104 comprise any component, system, or device that interprets and rasterizes print jobs(s) 110 to generate intermediate raster data 114, which is stored at RIP spool 111. As described herein, intermediate raster data 114 is subject to further processing prior to printing. For example, intermediate raster data 114 may comprise a partial bitmap of one or more logical pages that does not include raster data for a reusable object in print job 110. Memory 106 may comprise any electronic circuits, and/or optical circuits, and/or magnetic circuits that are able to store data. For example, memory 106 may cache raster images (not shown in FIG. 1) generated during a rip-to-spool phase and subsequently used during a print-from-spool phase of a two-phase printing process.

RBs 105 may be implemented in hardware, firmware, or combinations of hardware and firmware. RBs 105 comprise any component, system, or device that processes intermediate raster data 114 to generate complete raster data 118 for transmission. For example, print engine 101 may receive complete raster data 118. RBs 105 may, for example, combine cached rasterized page objects stored in memory 106 with intermediate raster data 114 during the print-from-spool phase in order to generate complete raster data 118 suitable for print engine 101.

Print engine 101 comprises any system, component, or device that marks a medium 120 with one or more colorants. The colorants may comprise toner, liquid inks, wax, or any material suitable to mark medium 120. Medium 120 may be continuous form or cut sheet, as desired. Medium 120 may comprise paper, textile, plastic, or any tangible substrate suitable for marking with a colorant. Print engine 101 may comprise one or more marking engines as a matter of design. For example, print engine 101 may comprise a marking engine on each side of medium 120.

In this embodiment, print controller 100 further includes a controller 108, which is communicatively coupled to compute nodes 102. In some embodiments, controller 108 may be implemented on one or more of compute nodes 102. Controller 108 receives print job(s) 110 and identifies a distribution of logical pages 112 of print job(s) 110 to compute nodes 102 for rasterization. In one embodiment, logical pages 112 are distributed to compute nodes 102, and compute nodes 102 perform page distributions to their respective RIPs 104. In another embodiment, logical pages 112 are distributed to RIPs 104 of compute nodes 102.

Controller 108 generates page assignment information 116, which maps logical pages 112 to a rasterization destination (e.g., compute nodes 102 or RIPs 104) based on the distribution of logical pages 112. Controller 108 is also tasked with directing a distribution of intermediate raster data 114 to compute nodes 102 based on page assignment information 116. In some embodiments, controller 108 may perform some interpretation of print job 110 to identify logical pages 112.

Figure 2:
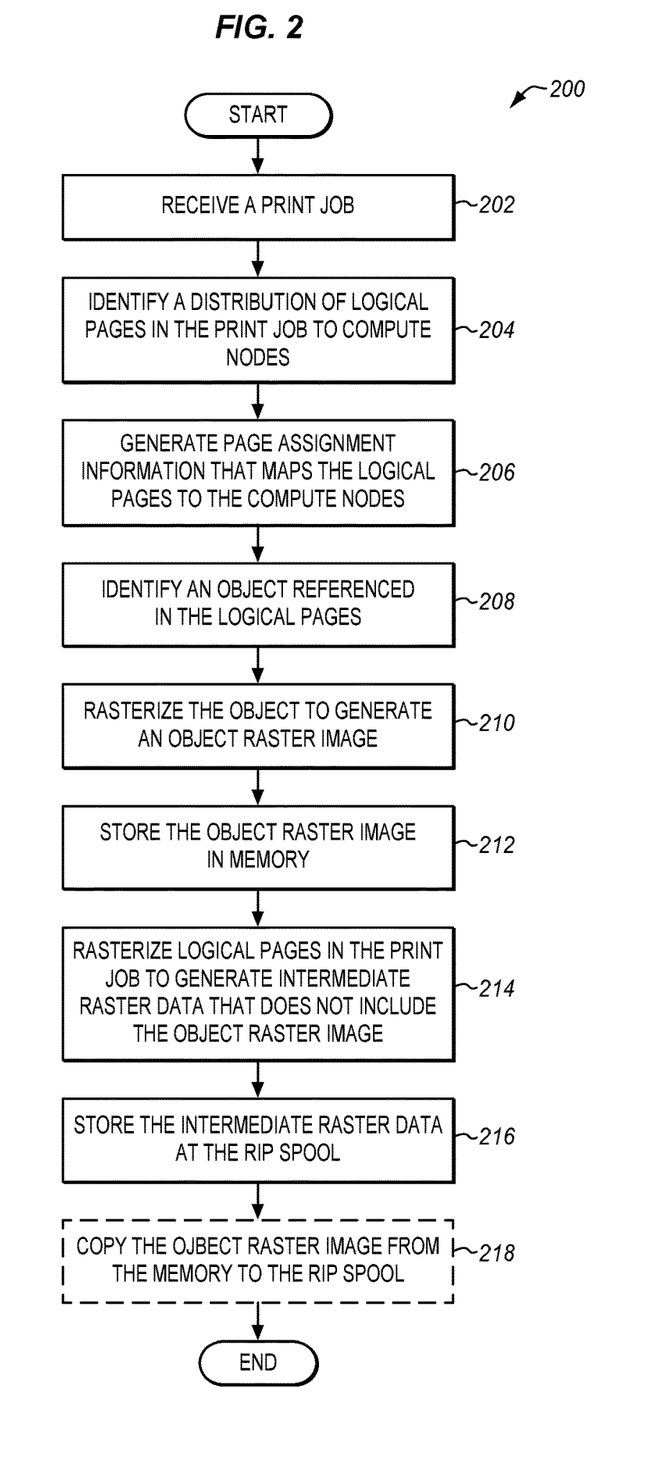
FIG. 2 is a flow chart of a method of performing page synchronization during a first-phase of a two-phase printing process in an illustrative embodiment.

Consider that print controller 100 is operational and ready to begin processing print job(s) 110. FIG. 2 is a flow chart of a method 200 of performing page synchronization during a first-phase of a two-phase printing process in an illustrative embodiment. Method 200 will be discussed with respect to print controller 100 of FIG. 1, although method 200 may be performed by other systems, not shown. The steps of the flow charts described herein may include other steps that are not shown. Also, the steps of the flow charts described herein may be performed in an alternate order.

Controller 108 receives print job 110 (see FIG. 2, step 202). Print job 110 may utilize a Page Description Language (PDL) to describe print data in print job 110. Some examples of a PDL include the Portable Document Format (PDF), an Intelligent Printer Data Stream (IPDS), etc. Print job 110 may include job tickets in some embodiments, which provide a mechanism for specifying instructions for processing print job 110.

In response to receiving print job 110, controller 108 identifies a distribution of logical pages 112 to compute nodes 102 of FIG. 1 (see FIG. 2, step 204), which begins the first phase of a two-phase printing process (e.g., the first phase is the rip-to-spool phase). As discussed previously, a distribution of logical pages 112 to compute nodes 102 may comprise assigning logical pages 112 for rasterization to a particular compute node 102 and/or to a particular RIP 104 of the particular compute node 102.

Figure 3:
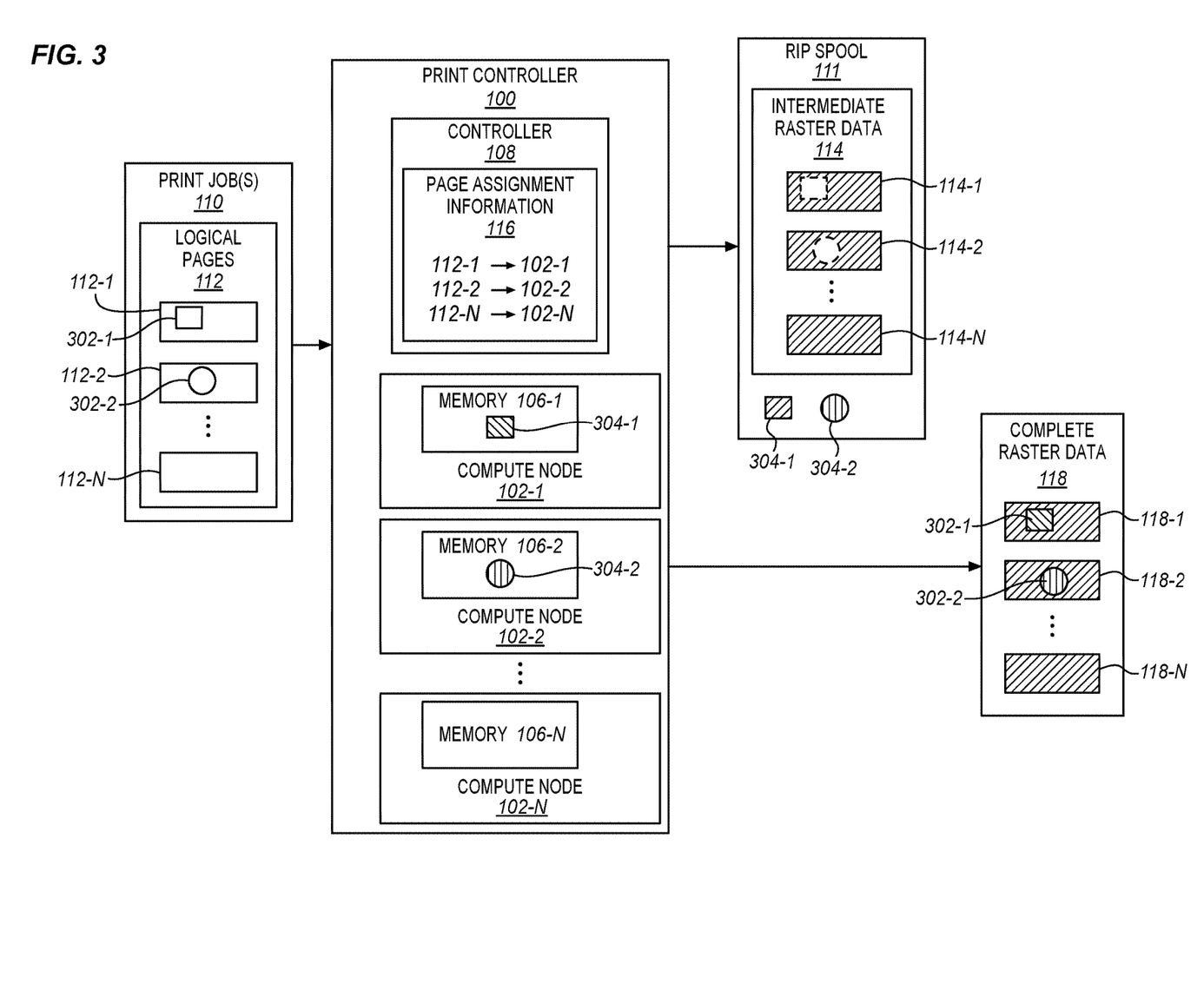
FIG. 3 is block diagram illustrating various transient data elements of a print controller during processing of a print job in an illustrative embodiment.

FIG. 3 is block diagram illustrating various transient data elements of print controller 100 during processing of print job 110 in an illustrative embodiment. The purpose of FIG. 3 is to enable discussion of one possible example of processing print job 110 and therefore, the various transient data elements illustrated in FIG. 3 are not intended to limit the operation of print controller 100 to the specific example.

In one non-limiting example, controller 108 identifies a distribution of logical pages 112-1 to compute node 102-1, logical pages 112-2 to compute node 102-2, and logical pages 112-N to compute node 102-N (see FIG. 1 and FIG. 3). As discussed previously, a distribution of logical pages 112 to compute nodes 102 may comprise distributing logical pages 112 for rasterization to a particular compute node 102 and/or to a particular RIP 104 of the particular compute node 102. For example, logical pages 112-1 may be distributed to RIP 104-1 of compute node 102-1, logical pages 112-2 may be distributed to RIP 104-1 of compute node 102-2, and logical pages 112-N may be distributed to RIP 104-1 of compute node 102-N. Although the example illustrates a specific distribution, other distributions exist.

Controller 108 generates page assignment information 116 that maps logical pages 112 in print job 110 to compute nodes 102 based on the distribution (see FIG. 2, step 206). Using the example distribution information detailed above, controller 108 generates page assignment information 116 illustrated in FIG. 3, which identifies that logical pages 112-1 are distributed to compute node 102-1, logical pages 112-2 are distributed to compute node 102-2, and logical pages 112-N are distributed to compute node 102-N.

Compute nodes 102 identify one or more objects 302 referenced in logical pages 112 (see FIG. 2, step 208). For instance, because compute node 102-1 is processing logical pages 112-1 in the example, object 302-1 illustrated in FIG. 3 is identified by compute node 102-1. Because compute node 102-2 is processing logical pages 112-2 in the example, object 302-2 illustrated in FIG. 3 is identified. While compute node 102-N is processing logical pages 112-N in the example, no objects 302 are referenced in logical pages 112-N.

In some embodiments, objects 302 comprise image objects. For instance, objects 302 may comprise a logo object. Objects 302 may be duplicated across different logical pages 112 in print job 110, or may exist on one logical page 112 of print job 110. For instance, reusable image objects such as a logo may be reproduced across most or all of logical pages 112 in print job 110. Some examples of objects 302 include a collection of text characters, a 1"×1" LZW-compressed 600 dpi×600 dpi JPEG image, and a full-page red line art object serving as the background upon which the text characters and image are placed. Each object 302 may provide self-identifying information that is present within the containing data stream, such that a data stream analyzer would be able to catalog each object 302 that comprises the page.

In response to identifying objects 302, objects 302 are rasterized to generate object raster images 304 as illustrated in FIG. 3 (see FIG. 2, step 210), and are stored in memory 106 (see FIG. 2, step 212). For example, compute node 102-1 may utilize its RIPs 104 to rasterize object 302-1 to generate object raster image 304-1, and store object raster image 304-1 into memory 106-1. Compute node 102-2 may utilize its RIPs 104 to rasterize object 302-2 to generate object raster image 304-2, and store object raster image 304-2 into memory 106-2.

In some embodiments, objects 302 are rasterized once, and reused by other compute nodes 102 during processing of print job 110. For instance, upon generating object raster image 304-1, compute node 102-1 may notify controller 108 and copy object raster image 304-1 to a memory of controller 108 (not shown) and/or to RIP spool 111. For instance, if controller 108 is implemented by one or more of compute nodes 102 functioning as a head node, then other compute nodes 102 may notify the head node and copy object raster image 304-1 to a memory 106 of the head node (not shown). If compute node 102-N identifies a reference to object 302-1 during processing of logical pages 112-N, then object raster image 304-1 may be downloaded by compute node 102-N into memory 106-N from the common data cache and/or from RIP spool 111. This improves the rasterization performance by preventing the re-rasterization of objects 302 by compute nodes 102.

In response to compute nodes 102 receiving their distribution of logical pages 112, RIPs 104 rasterize logical pages 112 to generate intermediate raster data 114 that does not include object raster image 304 (see FIG. 2, step 214). In continuing with the example, compute node 102-1 is distributed logical pages 112-1, and RIPs 104 associated with compute node 102-1 rasterize logical pages 112-1 of print job 110 to generate intermediate raster data 114-1 (e.g., a portion of intermediate raster data 114), which does not include object raster image 304-1 (see FIG. 3). Compute node 102-2 is distributed logical pages 112-2, and RIPs 104 associated with compute node 102-2 rasterize logical pages 112-2 of print job 110 to generate intermediate raster data 114-2 (e.g., another portion of intermediate raster data 114), which does not include object raster image 304-2 (see FIG. 3). Compute node 102-N is distributed logical pages 112-N, and RIPs 104 associated with compute node 102-N rasterizes logical pages 112-N of print job 110 to generate intermediate raster data 114-N (e.g., another portion of intermediate raster data 114).

Intermediate raster data 114 is stored at RIP spool 111 (see FIG. 2, step 216). For instance, intermediate raster data 114 may be stored to RIP spool 111 by RIPs 104 during page processing for print job 110. In an optional step, object raster images 304 may be copied from memory 106 to RIP spool 111 (see FIG. 2, step 218). In some embodiments, metadata may be stored at RIP spool 111 along with object raster images 304. The metadata may specify, for example, object raster images 304, which may be identified by a unique hash key, that resided in memory 106 during phase 1 processing.

In continuing with the example, object raster image 304-1 in memory 106-1 of compute node 102-1 may be copied to RIP spool 111, and object raster image 304-2 stored in memory 106-2 of compute node 102-2 may be copied to RIP spool 111 (see FIG. 3). This optional step may be performed, for example, when phase two of the two-phase printing process is delayed. For instance, the print-from-spool phase may occur days or weeks after the rip-to-spool phase. Copying object raster images 304 to RIP spool 111 allows object raster images 304 to be pre-loaded into memory 106 from RIP spool 111 prior to beginning the print-from-spool phase. This ensures that object raster images 304 are available to compute nodes 102 during assembly of complete raster data 118 from intermediate raster data 114.

Figure 4:
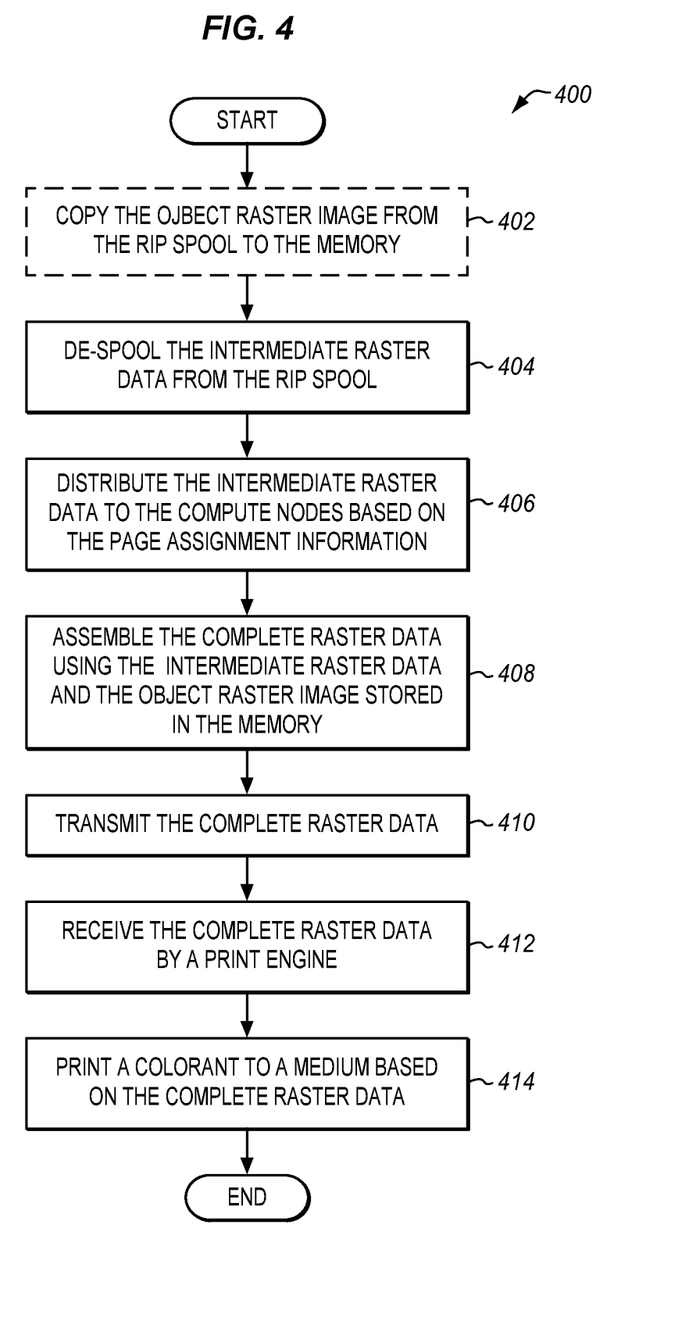
FIG. 4 is a flow chart of a method of performing page synchronization during a second-phase of a two-phase printing process in an illustrative embodiment.

As indicated above, the second phase of a two-phase printing process (e.g., the print-from-rip phase) may begin immediately, or at some later time in response to a request to generate a printed output for print job 110. FIG. 4 is a flow chart of a method 400 of performing page synchronization during a second-phase of a two-phase printing process in an illustrative embodiment. Method 400 will be discussed with respect to print controller 100 of FIG. 1, although method 400 may be performed by other systems, not shown.

In an optional step, object raster images 304 are copied from RIP spool 111 to memory 106 (see FIG. 4, step 402). For instance, the metadata previously described may be used to pre-load object raster images 304 from RIP spool 111 to memory 106. This process (e.g., pre-loading) may be performed based on page assignment information 116. For instance, object raster image 304-1 illustrated in FIG. 3 may be copied to memory 106-1 of compute node 102-1, and object raster image 304-2 illustrated in FIG. 3 may be copied to memory 106-2 of compute node 102-2. A determination may be made if memory 106 of compute node 102 includes object raster images 304 corresponding to the pages that are in page assignment information 116. If the determination is no, then pre-loading may be performed. If the determination is yes, then pre-loading may be skipped. For example, a determination may be made whether memory 106-1 of compute node 102-1 includes object raster image 304-1. If memory 106-1 does not include object raster image 304-1, then object raster image 304-1 may be copied to memory 106-1. If memory 106-1 does include object raster image 304-1, then copying object raster image 304-1 to memory 106-1 may be skipped.

Intermediate raster data 114 is de-spooled from RIP spool 111 (see FIG. 4, step 404), and is distributed to compute nodes 102 based on page assignment information 116 (see FIG. 4, step 406). In one embodiment, controller 108 may instruct compute nodes 102 to retrieve intermediate raster data 114 from RIP spool 111. In another embodiment, controller 108 may retrieve intermediate raster data 114 from RIP spool 111, and provide intermediate raster data 114 to compute nodes 102.

In one embodiment, the distribution of intermediate raster data 114 to compute nodes 102 is directed to be the same as assignment information 116. In continuing with the example described above for method 200, as intermediate raster data 114-1 (see FIG. 3) corresponds to logical pages 112-1 previously rasterized by compute node 102-1, intermediate raster data 114-1 is distributed to compute node 102-1. This ensures that object raster image 304-1 is locally cached in memory 106-1 and available to compute node 102-1 during the print-from-spool phase.

As intermediate raster data 114-2 corresponds to logical pages 112-2 previously rasterized by compute node 102-2, intermediate raster data 114-2 is distributed to compute node 102-2. This ensures that object raster image 304-2 illustrated in FIG. 3 is locally cached in memory 106-2 and available to compute node 102-1 during the print-from-spool phase.

As intermediate raster data 114-N corresponds to logical pages 112-N previously rasterized by compute node 102-N, intermediate raster data 114-N illustrated in FIG. 3 is distributed to compute node 102-N. However, since no objects 302 were referenced in logical pages 112-N, compute node 102-N may have no need for information stored in memory 106-N. In this case, intermediate raster data 114-N may be arbitrarily provided to one of compute nodes 102 for processing. For instance, during phase two of the printing process, intermediate raster data 114 may still be processed into sheet sides for printing.

Compute nodes 102 assemble intermediate raster data 114 into complete raster data 118 using object raster image 304 (see FIG. 4, step 408). As described herein, complete raster data 118 is ready for printing and may not be subject to additional processing (e.g., complete raster data 118 is formatted into sheet side images and includes the raster data needed to mark medium 120 to generate a printed output).

In continuing with the example, compute node 102-1 receives intermediate raster data 114-1, and its associated RBs 105 assemble intermediate raster data 114-1 and object raster image 304-1 cached in memory 106-1 to generate complete raster data 118-1 (see FIGS. 1 and 3). RBs 105 associated with compute node 102-2 assemble intermediate raster data 114-2 and object raster image 304-2 cached in memory 106-2 to generate complete raster data 118-2, and RBs 105 associated with compute node 102-N assemble intermediate raster data 114-N to generate complete raster data 118-N (see FIGS. 1 and 3).

As previously practiced, distributing intermediate raster data 114 to compute nodes 102 was performed in an arbitrary fashion without regard to data that may be cached in memory 106. When this occurs, a cache miss is likely and results in the RBs 105 of compute nodes 102 stalling while the missing data is loaded into memory 106. When the missing data is large in size, this problem is exacerbated. For instance, with high resolution image objects, a large amount of data may be transferred into memory 106, which requires time based on the IO performance of RIP spool 111 (if a cache miss requests missing object raster images 304 from RIP spool 111). Further, an arbitrary assignment of intermediate raster data 114 may result in the exhaustion of memory 106 when compute nodes 102 are already caching data. Thus, the 'replay' aspects of the present disclosure and/or the pre-loading object raster images 304 followed by targeted assignments of intermediate raster data 114 to compute nodes 102 can significantly improve the print-from-rip throughput of print controller 100.

Referring again to FIG. 4, complete raster data 118 may be transmitted (see FIG. 4, step 410). Complete raster data 118 may be received by print engine 101 (see FIG. 4, step 412), and print engine 101 applies one or more colorants to medium 120 based on complete raster data 118 (see FIG. 4, step 414).

The use of page assignment information 116 allows for data synchronization between the two-phases of the two-phase printing process. In particular, the use of page assignment information 116 allows for a 'replay' of the print-from-spool phase of the two-phase printing process on the same compute nodes 102 that originally generated the intermediate raster data 114, thereby reducing cache misses during raster data assembly prior to printing. Further, tracking page assignments during the rip-to-spool phase of the printing process enables more flexibility during the print-from-spool phase, with the ability to re-order assignments to compute nodes 102 by copying object raster images 304 from RIP spool 111 into memory 106 of a targeted compute node 102 prior to assigning the targeted compute node 102 with its relevant intermediate raster data 114.

Figure 5:
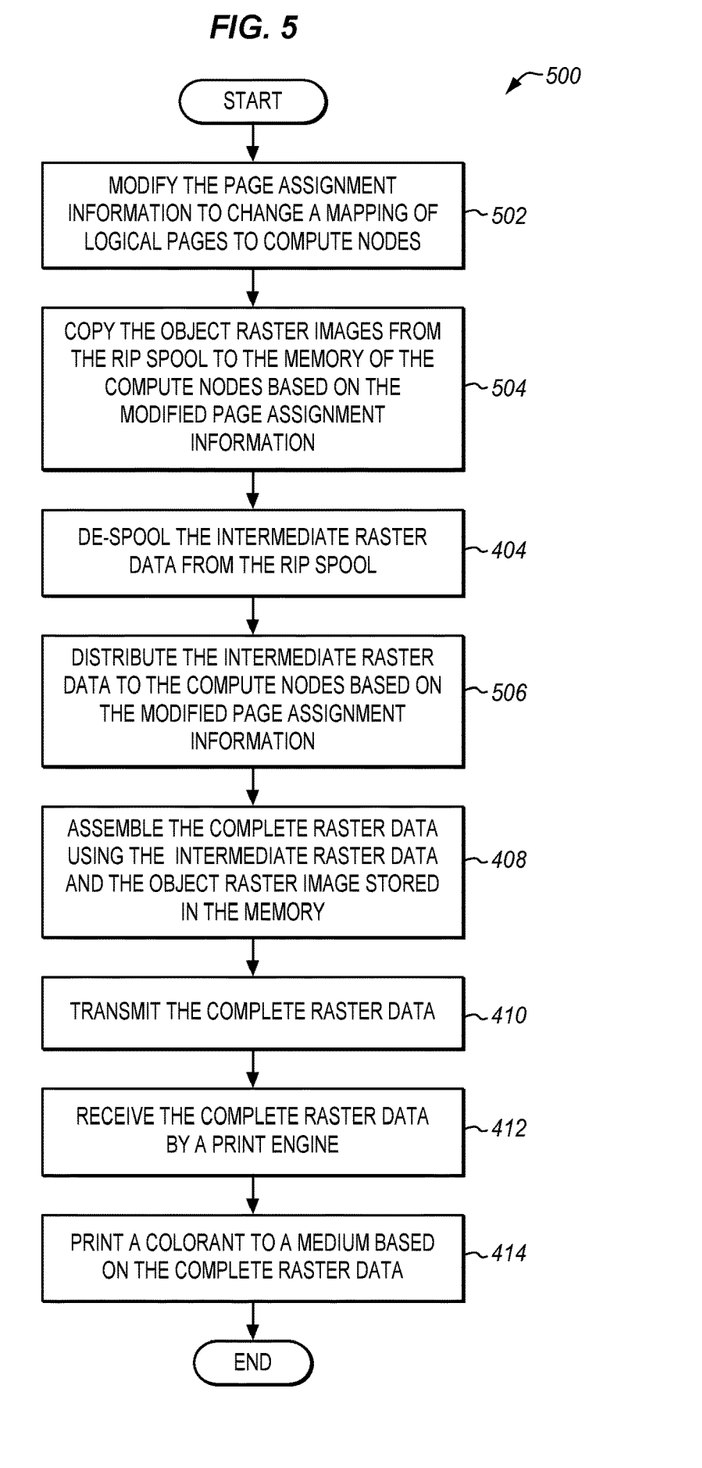
FIG. 5 is a flow chart of another method of performing page synchronization during a second-phase of a two-phase printing process in an illustrative embodiment.

FIG. 5 is a flow chart of another method 500 of performing page synchronization during a second-phase of a two-phase printing process in an illustrative embodiment. In some embodiments, page assignment information 116 may be modified to change how the page assignments are assigned to compute nodes 102. When page assignments are changed, object raster images 304 and intermediate raster data 114 may be re-assigned to one of compute nodes 102 that may not have originally been used during the first-phase.

Figure 6:
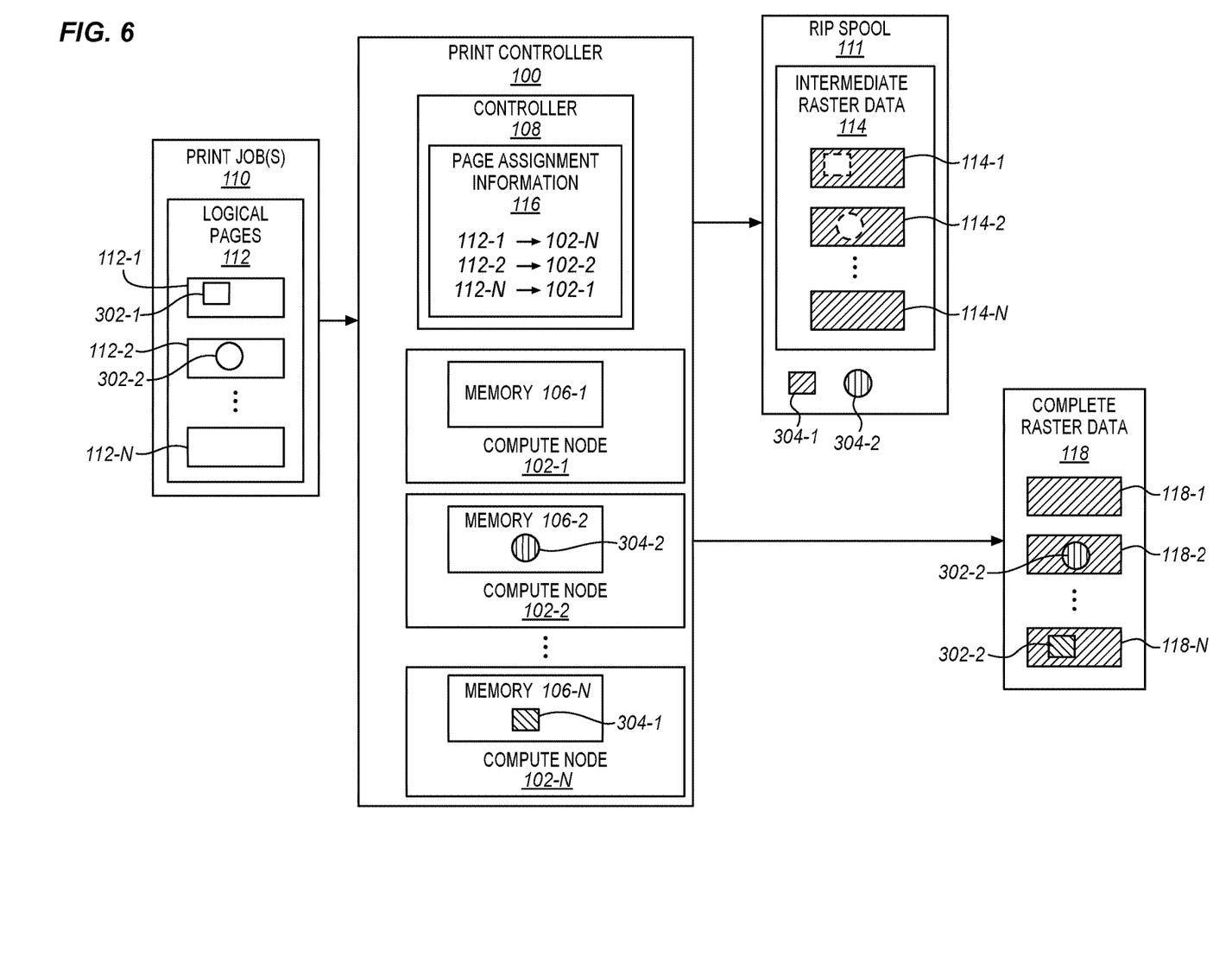
FIG. 6 is block diagram illustrating various transient data elements of a print controller during processing of a print job in another illustrative embodiment.

FIG. 6 is block diagram illustrating various transient data elements of print controller 100 during processing of print job 110 according to method 500 in an illustrative embodiment. The purpose of FIG. 6 is to enable discussion of one possible example of processing print job 110 and therefore, the various transient data elements illustrated in FIG. 6 are not intended to limit the operation of print controller 100 to the specific example.

Referring to FIGS. 5-6, page assignment information 116 may be modified to change a mapping of logical pages 112 to compute nodes 102 (see FIG. 5, step 502). For instance, page assignment information 116 may be modified to swap compute node 102-1 with compute node 102-N, as illustrated in FIG. 6. In one embodiment, modifications to page assignment information 116 includes changing the mapping of a number of logical pages 112, where the number is between two and the quantity of all of logical pages 112.

Object raster images 304 are copied from RIP spool 111 to memory 106 based on the modifications to page assignment information 116 (see FIG. 5, step 504). In continuing with the example, object raster image 304-1 is loaded into memory 106-N rather than to memory 106-1.

Intermediate raster data 114 is de-spooled from RIP spool 111 (see FIG. 4, step 404, previously described), and intermediate raster data 114 is distributed to compute nodes 102 based on the modifications to page assignment information 116 (see FIG. 5, step 506). In one embodiment, the distribution of intermediate raster data 114 to compute nodes 102 is directed to be the same as the modifications to page assignment information 116.

In continuing with the example, intermediate raster data 114-1 is distributed to compute node 102-N, and intermediate raster data 114-N is distributed to compute node 102-1. Compute node 102-N is tasked with assembling intermediate raster data 114-1 with object raster image 304-1. In a similar manner, compute node 102-1 is tasked with assembling intermediate raster data 114-N, although no object raster images 304 are referenced within logical pages 112-N. Referring again to FIG. 5, complete raster data 118 is assembled (see FIG. 4, step 408, previously described). Print controller 100 may transmit complete raster data 118 (see FIG. 4, step 410, previously described). Print engine 101 may receive complete raster data 118 (see FIG. 4, step 412, previously described), and print engine 101 prints complete raster data 118 to medium 120 (see FIG. 4, step 414, previously described).

Any of the various elements shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Figure 7:
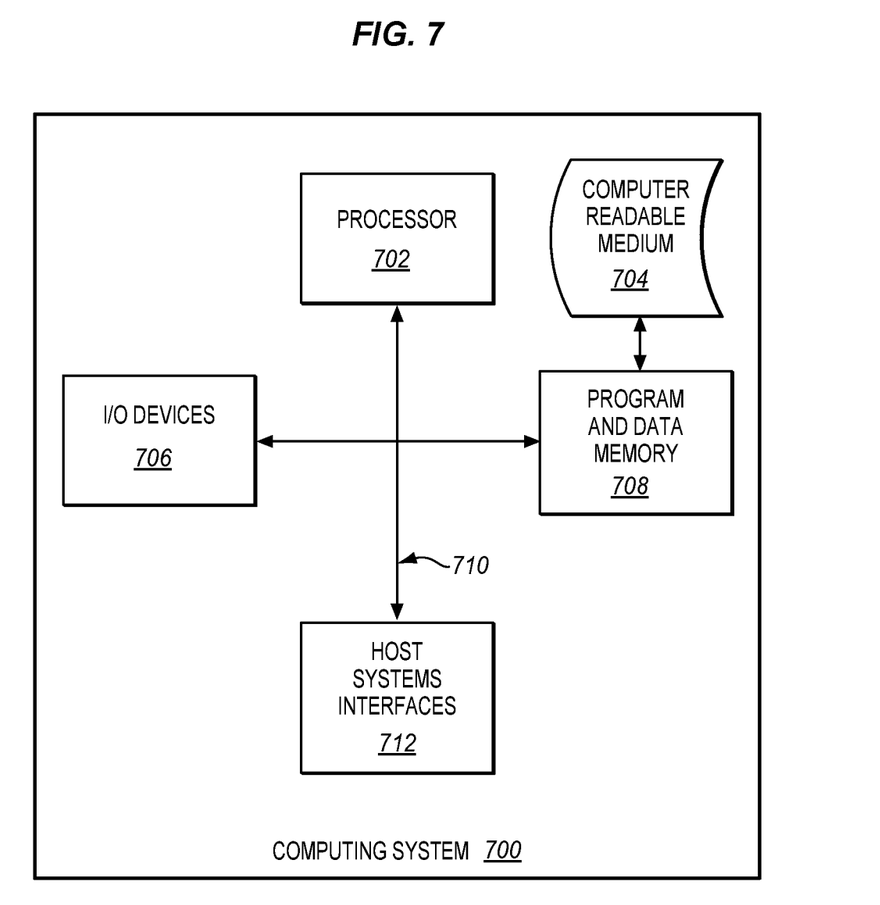
FIG. 7 is a block diagram of a computing system in which a computer readable medium may provide instructions for performing any of the functionality disclosed herein.

In one embodiment, the invention is implemented in software, which includes but is not limited to firmware, resident software, microcode, etc. FIG. 7 illustrates a computing system 700 in which a computer readable medium 704 may provide instructions for performing any of the functionality disclosed.

Furthermore, the invention can take the form of a computer program product accessible from computer readable medium 704 that provides program code for use by or in connection with a processor or any instruction execution system. For the purposes of this description, computer readable medium 704 can be any apparatus that can tangibly store the program for use by or in connection with the instruction execution system, apparatus, or device, including computing system 700.

Computer readable medium 704 can be any tangible electronic, magnetic, optical, electromagnetic, infrared, or semiconductor system (or apparatus or device). Examples of computer readable medium 704 include a semiconductor or solid-state memory, magnetic tape, a removable computer diskette, a random-access memory (RAM), a read-only memory (ROM), a rigid magnetic disk and an optical disk. Some examples of optical disks include compact disk-read only memory (CD-ROM), compact disk-read/write (CD-R/W) and DVD.

Computing system 700, suitable for storing and/or executing program code, can include one or more processors 702 coupled directly or indirectly to memory 708 through a system bus 710. Memory 708 can include local memory employed during actual execution of the program code, bulk storage, and cache memories which provide temporary storage of at least some program code in order to reduce the number of times code is retrieved from bulk storage during execution. Input/output (IO) devices 706 (including but not limited to keyboards, displays, pointing devices, etc.) can be coupled to the system either directly or through intervening IO controllers. Network adapters may also be coupled to the system to enable computing system 700 to become coupled to other data processing systems, such as through host systems interfaces 712, or remote printers or storage devices through intervening private or public networks. Modems, cable modem and Ethernet cards are just a few of the currently available types of network adapters.

Although specific embodiments were described herein, the scope is not limited to those specific embodiments. Rather, the scope is defined by the following claims and any equivalents thereof.

What is claimed is:

1. An apparatus, comprising:
at least two compute nodes, each comprising:
a Raster Image Processor (RIP); and
a raster builder; and
a controller configured to receive a print job, to identify a distribution of logical pages in the print job to the at least two compute nodes, and to generate page assignment information that maps the logical pages to the at least two compute nodes based on the distribution,
wherein the at least two compute nodes are configured to rasterize the logical pages to generate intermediate raster data using the RIPs, and to store the intermediate raster data at a RIP spool,
wherein the controller is configured to direct a distribution of the intermediate raster data from the RIP spool to the at least two compute nodes based on the page assignment information,
wherein the at least two compute nodes are configured to assemble the intermediate raster data into complete raster data using the raster builders.

2. The apparatus of claim 1, wherein:
the at least two compute nodes are configured to transmit the complete raster data, and the apparatus further comprises:
at least one print engine configured to receive the complete raster data, and to print at least one colorant to a medium based on the complete raster data.

3. The apparatus of claim 1, wherein:
the print job comprises a Variable Data Printing (VDP) Portable Document Format (PDF) print job.

4. The apparatus of claim 1, wherein:
each of the at least two compute nodes further comprise:
a memory,
a first compute node of the at least two compute nodes is configured to identify an object referenced in the logical pages distributed to the first compute node, to rasterize the object to generate an object raster image, to store the object raster image in a first memory of the first compute node, and to generate at least one portion of the intermediate raster data without including the object raster image in the at least one portion,
wherein the first compute node is configured to assemble at least one portion of the complete raster data using the at least one portion of the intermediate raster data and the object raster image stored in the first memory.

5. The apparatus of claim 4, wherein:
the object comprises an image object.

6. The apparatus of claim 4, wherein:
the first memory is configured to provide the object raster image to the RIP spool, and to receive the object raster image from the RIP spool prior to the first compute node assembling the at least one portion of the complete raster data.

7. The apparatus of claim 4, wherein:
the controller is configured to modify the page assignment information to change a mapping of logical pages rasterized by the first compute node to a second compute node, and
a second memory of the second compute node is configured to receive the object raster image from the RIP spool prior to the second compute node assembling the at least one portion of the complete raster data.

8. The apparatus of claim 1, wherein:
the controller is configured to modify the page assignment information after the logical pages in the print job are rasterized to change a mapping between the logical pages and the at least two compute nodes.

9. A method, comprising:
receiving a print job;
identifying a distribution of logical pages in the print job to at least two compute nodes;
generating page assignment information that maps the logical pages to the at least two compute nodes based on the distribution;
rasterizing, by the at least two compute nodes, the logical pages to generate intermediate raster data;
storing the intermediate raster data at a spool;
distributing the intermediate raster data from the spool to the at least two compute nodes based on the page assignment information; and
assembling, by the at least two compute nodes, the intermediate raster data into complete raster data.

10. The method of claim 9, further comprising:
transmitting the complete raster data;

receiving, by a print engine, the complete raster data; and printing, by the print engine, at least one colorant to a medium based on the complete raster data.

11. The method of claim 9, further comprising:

identifying, by a first compute node of the at least two compute nodes, an object referenced in the logical pages distributed to the first compute node;

rasterizing, by the first compute node, the object to generate an object raster image;

storing, by the first compute node, the object raster image in a first memory of the first compute node;

generating, by the first compute node, at least one portion of the intermediate raster data without including the object raster image in the at least one portion; and assembling, by the first compute node, at least one portion of the complete raster data using the at least one portion of the intermediate raster data and the object raster image stored in the first memory.

12. The method of claim 11, further comprising:

copying the object raster image from the first memory to a spool; and copying the object raster image from the spool to the first memory prior to assembling the at least one portion of the complete raster data.

13. The method of claim 11, further comprising:

modifying the page assignment information to change a mapping of logical pages rasterized by the first compute node to a second compute node; and copying the object raster image from the spool to a second memory of the second compute node prior to assembling the at least one portion of the complete raster data utilizing the second compute node.

14. The method of claim 9, further comprising:

modifying the page assignment information after the logical pages in the print job are rasterized to change a mapping between the logical pages and the at least two compute nodes.

15. A non-transitory compute readable medium embodying programmed instructions which, when executed by at least one processor, direct the at least one processor to:

receive a print job;

identify a distribution of logical pages in the print job to at least two compute nodes;

generate page assignment information that maps the logical pages to the at least two compute nodes based on the distribution;

rasterize, by the at least two compute nodes, the logical pages to generate intermediate raster data;

store the intermediate raster data at a spool;

distribute the intermediate raster data from the spool to the at least two compute nodes based on the page assignment information; and assemble, by the at least two compute nodes, the intermediate raster data into complete raster data.

16. The non-transitory compute readable medium of claim 15, wherein the programmed instructions further direct the at least one processor to:

transmit the complete raster data;

receive, by a print engine, the complete raster data; and print, by the print engine, at least one colorant to a medium based on the complete raster data.

17. The non-transitory compute readable medium of claim 15, wherein the programmed instructions further direct the at least one processor to:

identify, by a first compute node of the at least two compute nodes, an object referenced in the logical pages distributed to the first compute node;

rasterize, by the first compute node, the object to generate an object raster image;

store, by the first compute node, the object raster image in a first memory of the first compute node;

generate, by the first compute node, at least one portion of the intermediate raster data without including the object raster image in the at least one portion; and assemble, by the first compute node, at least one portion of the complete raster data using the at least one portion of the intermediate raster data and the object raster image stored in the first memory of the first compute node.

18. The non-transitory compute readable medium of claim 17, wherein the programmed instructions further direct the at least one processor to:

copy the object raster image from the first memory of the first compute node to a spool; and copy the object raster image from the spool to the first memory of the first compute node prior to assembling the at least one portion of the complete raster data.

19. The non-transitory compute readable medium of claim 17, wherein the programmed instructions further direct the at least one processor to:

modify the page assignment information to change a mapping of logical pages rasterized by the first compute node to a second compute node; and copy the object raster image from the spool to a second memory of the second compute node prior to assembling the at least one portion of the complete raster data utilizing the second compute node.

20. The non-transitory compute readable medium of claim 15, wherein the programmed instructions further direct the at least one processor to:

modify the page assignment information after the logical pages in the print job are rasterized to change a mapping between the logical pages and the at least two compute nodes.

* * * * *